Aug. 9, 1949.   H. M. SINGLETON   2,478,718
ANTITACK AGENT
Filed Jan. 2, 1947
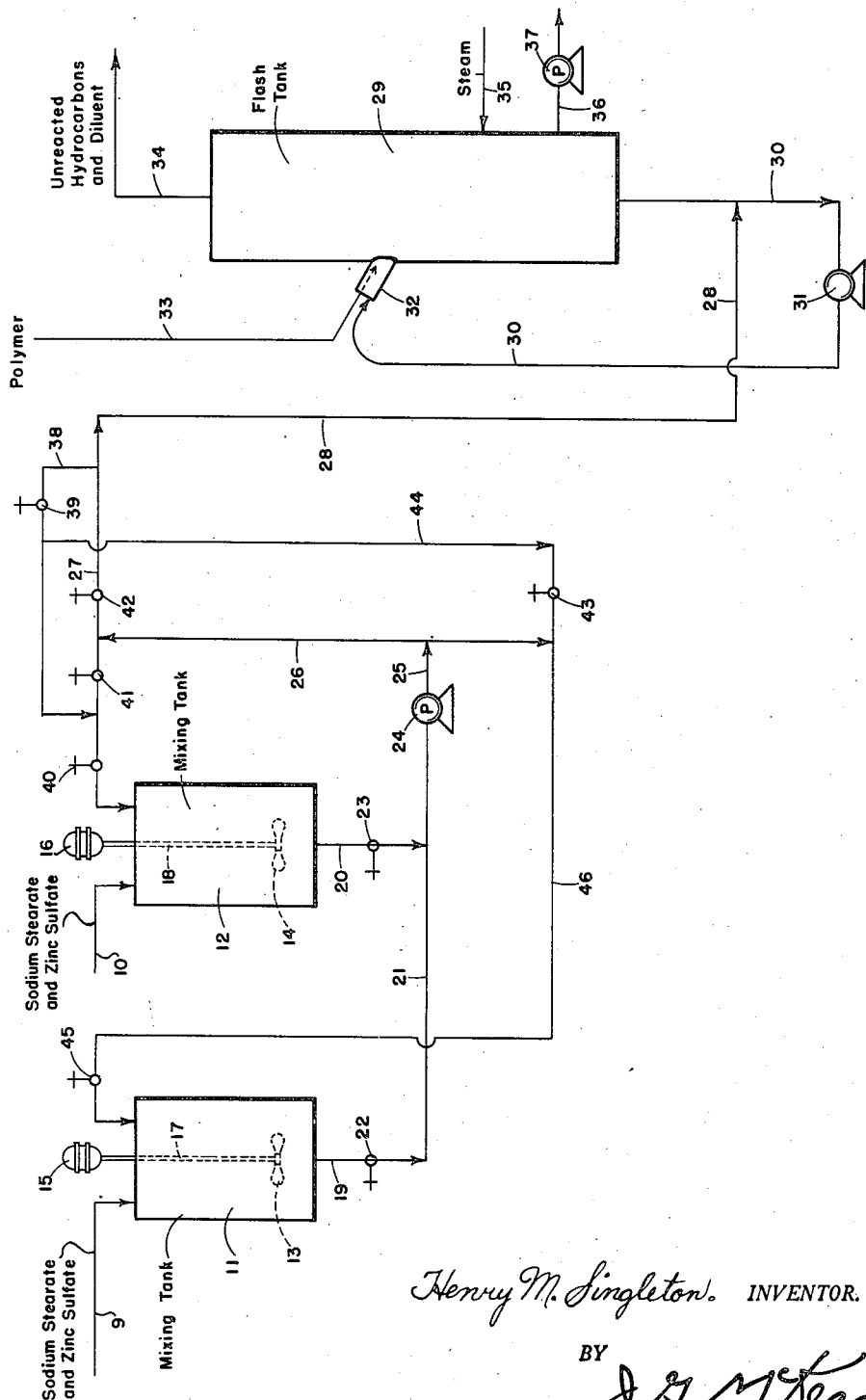
Henry M. Singleton, INVENTOR.
BY
ATTORNEY.

Patented Aug. 9, 1949

2,478,718

UNITED STATES PATENT OFFICE 2,478,718

ANTITACK AGENT

Henry M. Singleton, Goose Creek, Tex., assignor, by mesne assignments, to Standard Oil Development Company, Elizabeth, N. J., a corporation of Delaware Application January 2, 1947, Serial No. 719,728

1 Claim. (Cl. 260—414)

The present invention is directed to a method for handling high molecular weight polymers as a dispersion in an aqueous solution. More particularly, the invention is concerned with a method for dispersing butyl rubber in an aqueous solution in such a manner that formation of agglomerated bodies is substantially eliminated.

In the production of the hydrocarbon polymer known to the art as butyl rubber, it is conventional practice to polymerize a mixture of a mono-olefin, such as isobutylene, and a diolefin, such as isoprene, in a diluent at a low temperature of the order of −40° to −175° F. employing a Friedel-Crafts type catalyst, such as aluminum chloride, to obtain a polymer of high molecular weight and having vulcanizable characteristics. The polymerization is conducted at low temperatures preferably in the range of about −100° to −140° F. with the hydrocarbon diluted with a diluent such as an alkyl halide; methyl chloride has been used successfully commercially. The Friedel-Crafts catalyst, aluminum chloride for example, is also dissolved in a solvent which may be methyl chloride and the solution is chilled to the aforesaid low temperature range before contacting the diluted hydrocarbon feed.

It is customary to employ a feed comprising approximately 25% hydrocarbon and 75% alkyl halide. The hydrocarbon component of the feed stock may include 97½% isobutylene and the remaining 2½% isoprene. Variations in the hydrocarbon feed component of the feed stock and the diluent may be employed successfully.

After the polymer has been formed as a slurry of rubber particles in the diluent, the polymer must be separated and then further processed before it can be successfully employed in the manufacture of rubber goods. In order to handle this rubber dispersion in the diluent, it is necessary to remove this rubber from the diluent and the unreacted feed stock. This is usually done by flash distillation in which the hydrocarbon and the diluent are vaporized from the rubber particles and is usually accomplished by dumping the slurry suspended in the diluent and unreacted hydrocarbon into an aqueous media such as alcoholic solutions or warm water. The latter at a temperature of about 140° to 170° F. is usually employed commercially. However, this latter operation is attended by difficulties since the fine rubber particles have a tendency to adhere together, agglomerate, and coalesce into large rubbery bodies which cannot be handled in pipelines and pumping equipment without clogging the equipment. It is, therefore, necessary in the commercial operation of the process to add dispersion or anti-tack agents to prevent formation of the agglomerated bodies and to maintain the rubber particles in a finely divided condition. The metallic salts of fatty acids, which are relatively insoluble in water and only slightly soluble in the rubber polymer, have been employed successfully. There is one great objection to employment of the metallic salts of the fatty acids as the dispersion or anti-tack agent since these materials in their course of manufacture are dried and reground to particle size specification prior to shipment to points of utilization. It is postulated that during the drying operation a certain amount of the metallic soap is fused together in the form of lumps and, therefore, requires regrinding. It has been demonstrated that portions of the fused and reground material is ineffective as a dispersion and anti-tack agent, and, hence, a serious economic loss is suffered.

It is, therefore, the main object of the present invention to provide a method of forming an anti-tack and dispersion agent for high molecular weight hydrocarbons, in situ, in which a material having the desirable properties is obtained in finely divided form.

In accordance with the present invention, a saturated aqueous solution of an alkali metal salt of a substantially saturated aliphatic fatty acid is formed. The solution is then agitated violently with a salt of an alkaline metal selected from groups II and III of the periodic table while controlling the pH of the admixture between about 8 and 8.5 and maintaining the temperature below 150° F. The pH of the admixture is controlled by adding an aqueous solution of sodium hydroxide to the admixture during the agitation. After the admixture is formed, it is then added to the reaction product of a tertiary mono-olefin and a diolefin which has been formed in the presence of a Friedel-Crafts type catalyst at a temperature in the range from about −100° to −140° F.

In proceeding in accordance with the present invention, an alkali metal salt of a saturated aliphatic fatty acid is first dissolved in water to produce a very viscous solution thereof. The salt of the metal selected from groups II and III of the periodic table is then added to the viscous solution either as a concentrated aqueous solution or as a solid. This latter material goes into solution without formation of lumps. If, on the other hand, the alkali metal salt of a saturated aliphatic fatty acid were added to the solution of the salt of the metal of groups II or III of the periodic table, lump formation would have been encountered. During the addition of the salt of the metal of groups II or III of the periodic table to the saturated aqueous solution of the alkaline metallic salt of an aliphatic fatty acid, a high degree of agitation is necessary while controlling the pH in the range between 8 and 8.5. This is accomplished by adding to the admixture the necessary amount of an aqueous alkaline solution such as sodium hydroxide. During this stage of the operation, it is also important to add a wetting agent such as sodium sulfonates. Sodium sulfonates may be obtained by caustic neutralization of the oil-soluble sulfonic acids formed during sulfuric acid treatment of solvent extracts. The amount of the wetting agent, such as sodium sulfonates, is critical in that if an insufficient quantity is employed, reaction product separates from the solution as a powder whereas if an excess of sodium sulfonates is employed, the reaction product is wetted to the extent that it does not have suitable anti-tack and dispersion properties when added to the hydrocarbon polymer. During this latter operation, it is also desirable to add to the dispersion agent a stabilizer which during the course of the rubber milling and handling operations will prevent the rubber from depolymerizing. A stabilizer such as phenyl beta naphthylamine may be used.

The present invention will be further described in conjunction with the drawing in which the single figure is in the form of a flow diagram illustrating one modification thereof.

Referring now to the drawing, numerals 11 and 12 designate mixing tanks provided with mixing means 13 and 14 actuated by prime movers 15 and 16 through shafts 17 and 18. Mixing tanks 11 and 12 connect by way of lines 19 and 20 to manifold 21. Lines 19 and 20 are controlled by valves 22 and 23. Line 21 is provided with a pump 24 and is connected by line 25 and branch line 26 into manifold 27. Manifold 27 is connected by line 28 with flash tank 29.

In the operation of the invention, sodium stearate, for example, is dissolved in either tank 11 or 12 in a suitable amount of water to produce a very viscous solution thereof. Zinc sulfate is added to the tank either as a solution or in the solid form while violently agitating the contents of the tanks with mixing means 13 and 14. In the drawing, mixing tank 11 is shown provided with an inlet line 9 for the addition of sodium stearate and zinc sulfate thereto and mixing tank 12 is shown with an inlet line 10 for the addition of sodium stearate and zinc sulfate thereto. It will be understood that the inlet lines 9 and 10 are shown for illustrative purposes only; as heretofore explained, the sodium stearate may be added in solid form and the zinc sulfate may be added either in the form of a solution or in the solid form to these mixing tanks. A sufficient amount of sodium sulfonates, phenyl beta naphthylamine, and sodium hydroxide is then added during the course of operation. After the admixture has been sufficiently agitated to form a reaction product between the sodium stearate and the zinc sulfate, one of the tanks, for example tank 12, may be put into the operating system by opening valve 23 in line 20 and starting pump 24 which pumps the solution through line 26, manifold 27 and line 28 into line 30 which discharges material from the flash tank 29. Material withdrawn from the bottom of flash tank 29 is largely water containing the dispersion agent. This material is pumped by pump 31 into delivery pipe 32 into which a cold stream of rubber polymer dissolved in methyl chloride, for example, is delivered by way of line 33. The temperature of the solution in line 30 is between 140° and 170° F. while the temperature of the polymer slurry in line 33 is between −100° and −140° F. It will be readily apparent that the large temperature differential between the two streams entering tank 29 through line 32 results in heating of the colder of the two streams and distillation of the unreacted hydrocarbons and diluent therefrom. These materials flash from the solution and are discharged from flash tank 29 through line 32 to a recovery stream, not shown. Steam may be injected by way of line 35 to maintain the temperature of the aqueous solution in the bottom of tank 29 between 140° and 170° F. At an intermediate point from the bottom of tank 29 an aqueous dispersion of rubber particles in water is withdrawn by line 36 and pump 37 to handling and milling facilities, not shown.

While adding the reaction product of sodium stearate and zinc sulfate to the reaction product of the tertiary mono-olefin and diolefin, it may be desirable to recirculate a part of the aqueous solution thereof back to the mixing tank 12. Suitable valves and connections are, therefore, provided in manifold 27. By-pass line 38 controlled by valve 39 allows recirculation of the reaction product back into tank 12. Valves 40, 41, and 42 in manifold 27 are provided for control of the quantities of solution flowing from mixing tank 12 to flash tank 29.

When the contents of tank 12 become depleted, by a simple manipulation of valve 23 it may be withdrawn from operation and by opening valve 22 in line 19, tank 11 may be placed in operation while the contents of tank 12 are being renewed by make up of fresh solution. When tank 11 is in operation and tank 12 has been taken off, the operating stream, valve 40 will be closed and valve 43 in line 44 opened. Similar to the flow with respect to tank 12, a portion of the reactant mixture flowing through manifold 27 may be returned to tank 11 by opening valve 45 in line 46 which allows return of the mixture by line 21, pump 24, line 25, line 26, and line 46 to tank 11.

The aqueous slurry of hydrocarbon polymer passing through line 36 is suitably dispersed therein and the rubber polymers are coated with an anti-tack agent to prevent its forming agglomerates and sticking to the hot parts of the driers, extruders and mills with which it comes into contact during its processing operation.

As an example of the operation of the present invention, a commercial run in a butyl rubber plant was made in which the anti-tack and dispersion agent in accordance with the present invention was prepared. In this particular run 65 pounds of zinc sulfate crystals ($ZnSO_4 \cdot 7H_2O$), 123 pounds sodium stearate, 17.4 pounds of phenyl beta naphthylamine, 1.4 quarts of sodium sulfonates, 1 quart of 50% sodium hydroxide solution were made up to a total volume of 500 gallons in equipment similar to tanks 11 and 12. This solution had a total solids content of approximately 0.35 pound per gallon. The sodium stearate was first dissolved in 200 gallons of water. The sodium hydroxide was then added followed by addition of the solid zinc sulfate. After the zinc sulfate has completely reacted with the sodium stearate to form zinc stearate, a mixture of phenyl beta naphthylamine and sodium sulfonates in 5 gallons of water was then added and the total volume adjusted up to the aforementioned 500 gallons. The function of the caustic soda was to control the pH of the mixture. The amount of caustic added gave a pH of 8. Control of alkalinity between 8 and 8.5 gives formation of the desired particle size dispersion and anti-tack agent. The temperature employed was below 150° F.

In forming the solution in accordance with the present invention, it is necessary that essentially a saturated solution of the major components of the mixture be employed, that a high degree of agitation during the reaction be maintained, and that the pH of the reaction mixture be carefully controlled without exceeding a temperature of 150° F.

The additive mixture prepared as described above was then added to the reaction product of isobutylene and isoprene which was formed in the presence of aluminum chloride at a temperature of —140° F. During runs of 3 hours', 21 hours', and 37 hours' duration, it was found that no lumpy wet rubber agglomerates were formed and the material discharged through line 36 was thoroughly dispersed in the water solution and was easily handled in the driers, extruders, and mills making up the finishing processing equipment.

During the course of a comparison between the reaction products of the present invention with zinc stearate produced in conventional operations in which it was dried and reground, it was found that the amount of additive necessary in satisfactorily conditioning the polymer for subsequent handling and milling was reduced by approximately 55% which represents a considerable economic gain.

While the invention has been described with respect to the employment of sodium stearate in forming the zinc stearate in situ, it will be apparent to the skilled worker that stearic acid may comprise one of the starting materials. If desired, stearic acid may be reacted with caustic soda to form sodium stearate and the sodium stearate then formed employed in producing the anti-tack and dispersion agent in accordance with the present invention. Actually in commercial operations, it may be preferred to begin with stearic acid rather than sodium stearate.

Throughout the specification and claim emphasis has been placed on the employment of a metal salt of a saturated aliphatic fatty acid. It is within the spirit and scope of the present invention to employ, as the fatty acid component, a fatty acid which may contain residual unsaturation. When the fatty acid contains residual unsaturation, it is desirable that the amount of unsaturation should not exceed the equivalent to that of stearic acid having an iodine value of 15; best results, however, are obtained with a fatty acid having a residual iodine number of 8 maximum.

The invention has been described and illustrated with respect to the employment of zinc as illustrative of the groups II and III metals. It is contemplated that other metal salts may be used in forming the anti-tack and dispersion agent of the present invention. For example, calcium, magnesium, aluminum, and barium salts may be used effectively. Under some conditions, it may be desirable to use salts of these metals in preferance to zinc by virtue of their higher melting points.

The nature and objects of the present invention having been fully described and illustrated, what I wish to claim as new and useful and to secure by Letters Patent is:

A process for preparing an anti-tack agent for a rubbery polymer which comprises the steps of dissolving sodium stearate in water to form a saturated solution, adding zinc sulfate thereto and agitating the mixture violently at a temperature below approximately 150° F., and controlling the pH of the mixture between 8 and 8.5 by adding to the mixture sodium hydroxide and sodium sulfonate solution to form a solution having a solids content of approximately 0.35 pound per gallon.

HENRY M. SINGLETON.

REFERENCES CITED

The following references are of record in the file of this patent:

UNITED STATES PATENTS

| Number | Name | Date |
|---|---|---|
| 2,378,693 | Fryling | June 19, 1945 |
| 2,417,071 | Gebhart et al. | Mar. 11, 1947 |